United States Patent
Eiselt

(10) Patent No.: US 7,924,496 B2
(45) Date of Patent: Apr. 12, 2011

(54) APPARATUS AND METHOD FOR RAMAN GAIN CONTROL

(75) Inventor: Michael H. Eiselt, Middletown, NJ (US)

(73) Assignee: Pivotal Decisions LLC, Las Vegas, NV (US)

( * ) Notice: Subject to any disclaimer, the term of this patent is extended or adjusted under 35 U.S.C. 154(b) by 1623 days.

(21) Appl. No.: 10/454,772

(22) Filed: Jun. 3, 2003

(65) Prior Publication Data

US 2004/0075887 A1    Apr. 22, 2004

Related U.S. Application Data

(60) Provisional application No. 60/386,086, filed on Jun. 4, 2002.

(51) Int. Cl.
 *H01S 4/00* (2006.01)
 *H04B 10/12* (2006.01)
(52) U.S. Cl. ....................................................... 359/334
(58) Field of Classification Search .................. 359/334
 See application file for complete search history.

(56) References Cited

U.S. PATENT DOCUMENTS

| | | | |
|---|---|---|---|
| 4,229,831 A | 10/1980 | Lacher | |
| 4,535,459 A | 8/1985 | Hogge, Jr. | |
| 4,636,859 A | 1/1987 | Vernhet et al. | |
| 4,710,022 A | 12/1987 | Soeda et al. | |
| 5,224,183 A | 6/1993 | Dugan | |
| 5,225,922 A | 7/1993 | Chraplyvy et al. | |
| 5,267,071 A | 11/1993 | Little et al. | |
| 5,299,048 A | 3/1994 | Suyama | |
| 5,321,541 A | 6/1994 | Cohen | |
| 5,455,703 A | 10/1995 | Duncan et al. | |
| 5,559,625 A | 9/1996 | Smith et al. | |
| 5,613,210 A | 3/1997 | Van Driel et al. | |
| 5,726,784 A | 3/1998 | Alexander et al. | |
| 5,737,118 A | 4/1998 | Sugaya et al. | |
| 5,778,116 A | 7/1998 | Tomich | |
| 5,790,285 A | 8/1998 | Mock | |
| 5,812,290 A | 9/1998 | Maeno et al. | |
| 5,877,881 A | 3/1999 | Miyauchi et al. | |
| 5,903,613 A | 5/1999 | Ishida | |
| 5,914,794 A | 6/1999 | Fee | |
| 5,914,799 A | 6/1999 | Tan | |
| 5,936,753 A | 8/1999 | Ishikaawa | |
| 5,940,209 A | 8/1999 | Nguyen | |
| 5,963,350 A | 10/1999 | Hill | |

(Continued)

FOREIGN PATENT DOCUMENTS

JP        01115230        5/1989

(Continued)

OTHER PUBLICATIONS

Agrawal, "Optical Amplifiers - Fiber Raman Amplifiers," Fiber-Optic Communication Systems, 1997, pp. 381-383.

*Primary Examiner* — Eric Bolda
(74) *Attorney, Agent, or Firm* — Woodcock Washburn LLP

(57) ABSTRACT

Systems and methods for controlling a Raman amplifier by measuring power at one end of an optical fiber span. The Raman amplifier may include a laser that pumps an optical signal into the optical fiber span. The Raman amplifier may be connected to a controller that receives backscatter measurements. The controller may then adjust the Raman amplifier to maintain the backscatter substantially constant.

22 Claims, 8 Drawing Sheets

U.S. PATENT DOCUMENTS

| | | | |
|---|---|---|---|
| 5,995,694 A | 11/1999 | Akasaka et al. | |
| 6,005,702 A | 12/1999 | Suzuki et al. | |
| 6,021,245 A | 2/2000 | Berger et al. | |
| 6,038,062 A | 3/2000 | Kosaka | |
| 6,075,634 A | 6/2000 | Casper et al. | |
| 6,078,414 A | 6/2000 | Iwano | |
| 6,081,360 A | 6/2000 | Ishikawa et al. | |
| 6,084,694 A | 7/2000 | Milton et al. | |
| 6,088,152 A | 7/2000 | Berger et al. | |
| 6,108,074 A | 8/2000 | Bloom | |
| 6,122,095 A | 9/2000 | Fatehi | |
| 6,151,334 A | 11/2000 | Kim et al. | |
| 6,157,477 A | 12/2000 | Robinson | |
| 6,160,614 A | 12/2000 | Unno | |
| 6,163,392 A | 12/2000 | Condict et al. | |
| 6,163,636 A | 12/2000 | Stentz et al. | |
| 6,173,094 B1 | 1/2001 | Bowerman et al. | |
| 6,177,985 B1 | 1/2001 | Bloom | |
| 6,198,559 B1 | 3/2001 | Gehlot | |
| 6,229,599 B1 | 5/2001 | Galtarossa | |
| 6,236,481 B1 | 5/2001 | Laor | |
| 6,236,499 B1 | 5/2001 | Berg et al. | |
| 6,246,510 B1 | 6/2001 | BuAbbud et al. | |
| 6,259,553 B1 | 7/2001 | Kinoshita | |
| 6,259,554 B1 | 7/2001 | Shigematsu et al. | |
| 6,259,693 B1 | 7/2001 | Ganmukhi et al. | |
| 6,259,845 B1 | 7/2001 | Sardesai | |
| 6,272,185 B1 | 8/2001 | Brown | |
| 6,275,315 B1 | 8/2001 | Park et al. | |
| 6,288,811 B1 | 9/2001 | Jiang et al. | |
| 6,288,813 B1 | 9/2001 | Kirkpatrick et al. | |
| 6,292,288 B1 | 9/2001 | Akasaka et al. | |
| 6,307,656 B2 | 10/2001 | Terahara | |
| 6,317,231 B1 | 11/2001 | Al-Salameh et al. | |
| 6,317,255 B1 | 11/2001 | Fatehi et al. | |
| 6,323,950 B1 | 11/2001 | Kim et al. | |
| 6,327,060 B1 | 12/2001 | Otani et al. | |
| 6,356,384 B1 | 3/2002 | Islam | |
| 6,359,729 B1 | 3/2002 | Amoruso | |
| 6,373,621 B1 * | 4/2002 | Large et al. | 359/334 |
| 6,388,801 B1 | 5/2002 | Sugaya et al. | |
| 6,396,853 B1 | 5/2002 | Humphrey et al. | |
| 6,433,922 B1 * | 8/2002 | Ghera et al. | 359/334 |
| 6,441,950 B1 | 8/2002 | Chen et al. | |
| 6,519,082 B2 * | 2/2003 | Ghera et al. | 359/341.4 |
| 6,724,524 B1 * | 4/2004 | Evans et al. | 359/334 |
| 6,850,360 B1 * | 2/2005 | Chen et al. | 359/334 |
| 2001/0005271 A1 | 6/2001 | Leclerc et al. | |
| 2001/0007605 A1 | 7/2001 | Inagaki et al. | |
| 2001/0009468 A1 | 7/2001 | Fee | |
| 2001/0014104 A1 | 8/2001 | Bottorff et al. | |
| 2002/0012152 A1 | 1/2002 | Agazzi et al. | |
| 2002/0015220 A1 | 2/2002 | Papernyl et al. | |
| 2002/0034197 A1 | 3/2002 | Tornetta et al. | |
| 2002/0041429 A1 | 4/2002 | Sugaya et al. | |
| 2002/0044317 A1 | 4/2002 | Gentner et al. | |
| 2002/0044324 A1 | 4/2002 | Hoshida et al. | |
| 2002/0048287 A1 | 4/2002 | Silvers | |
| 2002/0051468 A1 | 5/2002 | Ofek et al. | |
| 2002/0063948 A1 | 5/2002 | Islam et al. | |
| 2002/0064181 A1 | 5/2002 | Ofek et al. | |
| 2002/0075903 A1 | 6/2002 | Hind | |
| 2002/0080809 A1 | 6/2002 | Nicholson et al. | |
| 2003/0058524 A1 | 3/2003 | Akasaka et al. | |

FOREIGN PATENT DOCUMENTS

| | | |
|---|---|---|
| JP | 02238736 | 9/1990 |

* cited by examiner

APPARATUS AND METHOD FOR RAMAN GAIN CONTROL

CROSS-REFERENCE TO RELATED APPLICATION

This application claims priority to U.S. Provisional Application Ser. No. 60/386,086, entitled "Method and Apparatus for Raman Gain Control", by Eiselt, filed Jun. 4, 2002.

TECHNICAL FIELD OF THE INVENTION

The present invention relates, in general, to the field of optical communications, and in particular to, an optical transport system that uses Raman optical amplifiers. In particular the invention teaches an apparatus and method to control the Raman gain based upon power measurements at one end of the transmission fiber.

BACKGROUND OF THE INVENTION

A goal of many modem long haul optical transport systems is to provide for the efficient transmission of large volumes of voice traffic and data traffic over trans-continental distances at low costs. Various methods of achieving these goals include time division multiplexing (TDM) and wavelength division multiplexing (WDM). In time division multiplexed systems, data streams comprised of short pulses of light are interleaved in the time domain to achieve high spectral efficiency, high data rate transport. In wavelength division multiplexed systems, data streams comprised of short pulses of light of different carrier frequencies, or equivalently wavelength, are co-propagate in the same fiber to achieve high spectral efficiency, high data rate transport.

The transmission medium of these systems is typically optical fiber. In addition there is a transmitter and a receiver. The transmitter typically includes a semiconductor diode laser, and supporting electronics. The laser may be directly modulated with a data train with an advantage of low cost, and a disadvantage of low reach and capacity performance. After binary modulation, a high bit may be transmitted as an optical signal level with more power than the optical signal level in a low bit. Often, the optical signal level in a low bit is engineered to be equal to, or approximately equal to zero. In addition to binary modulation, the data can be transmitted with multiple levels, although in current optical transport systems, a two level binary modulation scheme is predominantly employed.

Typical long haul optical transport dense wavelength division multiplexed (DWDM) systems transmit 40 to 80 channels of 10 Gbps (gigabit per second) across distances of 3000 to 6000 km in a single 30 nm spectral band. A duplex optical transport system is one in which traffic is both transmitted and received between parties at opposite end of the link. In current DWDM long haul transport systems transmitters different channels operating at distinct carrier frequencies are multiplexed using a multiplexer. Such multiplexers may be implemented using array waveguide grating (AWG) technology or thin film technology, or a variety of other technologies. After multiplexing, the optical signals are coupled into the transport fiber for transmission to the receiving end of the link.

At the receiving end of the link, the optical channels are de-multiplexed using a de-multiplexer. Such de-multiplexers may be implemented using AWG technology or thin film technology, or a variety of other technologies. Each channel is then optically coupled to separate optical receivers. The optical receiver is typically comprised of a semiconductor photodetector and accompanying electronics.

The total link distance may in today's optical transport systems be two different cities separated by continental distances, from 1000 km to 6000 km, for example. To successfully bridge these distances with sufficient optical signal power relative to noise, the total fiber distance is separated into fiber spans, and the optical signal is periodically amplified using an in line optical amplifier after each fiber span. Typical fiber span distances between optical amplifiers are 50-100 km. Thus, for example, 30 100 km spans would be used to transmit optical signals between points 3000 km apart. Examples of inline optical amplifiers include erbium doped fiber amplifiers (EDFAs) and semiconductor optical amplifiers (SOAs).

Alternatively, a Raman optical amplifier may be used to boost the optical signal power. Most Raman optical amplifiers comprise at least one high power pump laser that is launched into the fiber span. Through the nonlinear optical process of stimulated Raman scattering in the $SiO_2$ of the glass of the fiber span, this pump signal provides gain to the optical signal power. A Raman amplifier may be co-propagating or counter-propagating to the optical signal, and a common configuration is to counter-propagate the Raman pump. A Raman amplifier may be used alone, or in combination with an alternate example of an inline optical amplifier, such as an EDFA. For example, a Raman amplifier may be used in conjunction with an inline optical amplifier to accommodate high loss spans and to bring the net span loss within an allowable system dynamic range.

When a plurality of high power Raman pump lasers are used it is desirable to control the gain. An example of Raman amplifier gain control in the current art is to measure the input signal power and output signal power and to compare these measurements. In a Raman amplifier that uses the fiber span, this control method is slow because of the large distance between the input and the output of the fiber span. Consequently there is a need for a fast Raman gain control method, and in particular a Raman gain control method that is based on power measurements on only one end of the transmission fiber span.

In another Raman amplifier gain control method currently practiced, the gain was controlled with a probe wavelength. This method is not optimal, however, because extra hardware is required, and the additional optical signal limits the reach and capacity of the optical transport system. Consequently there is a need for a Raman gain control method that does not employ a probe wavelength.

SUMMARY OF THE INVENTION

In the present invention, improvements to Raman gain control are taught based on power measurements on only one end of the transmission fiber span, and do not use a dedicated probe wavelength.

In one aspect of the invention, a Raman gain control apparatus for counter propagating pump and signal based on signal output power measurements is taught.

In another aspect of the invention, a Raman gain control method for counter propagating pump and signal based on signal output power measurements is taught.

In one aspect of the invention, a Raman gain control apparatus for counter propagating pump and signal based on backscattered pump power measurements is taught.

In another aspect of the invention, a Raman gain control method for counter propagating pump and signal based on backscattered pump power measurements is taught.

In another aspect of the invention, a Raman gain control apparatus for co-propagating pump and signal based on signal input power measurements is taught.

In another aspect of the invention, a Raman gain control method for co-propagating pump and signal based on signal input power measurements is taught.

In one aspect of the invention, a Raman gain control apparatus for co-propagating pump and signal based on backscattered pump power measurements is taught.

In another aspect of the invention, a Raman gain control method for co-propagating pump and signal based on backscattered pump power measurements is taught.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments described herein are merely illustrative of specific ways to make and use the invention and do not delimit the scope of the invention.

Figure 1:
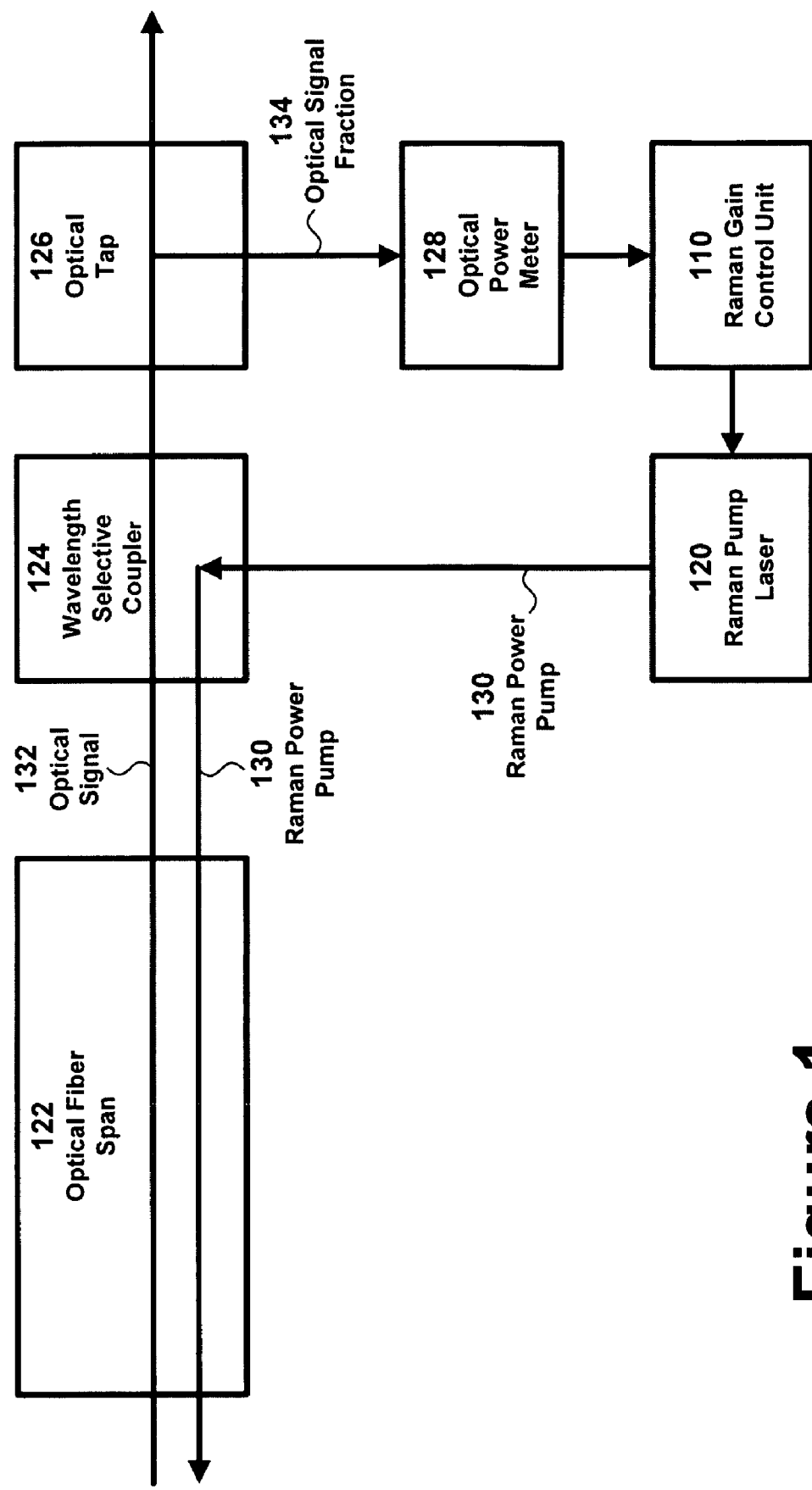
FIG. 1 is a schematic illustration of a Raman gain control apparatus for counter propagating pump and signal based on signal output power measurements.

In FIG. 1 is shown a block diagram of a Raman gain control apparatus for counter propagating pump and signal based on signal output power measurements. The Raman gain control apparatus comprises a Raman pump laser 120 that is optically coupled to a wavelength selective optical coupler 124. Wavelength selective coupler 124 is further optically coupled to fiber span 122 and optical tap 126. The apparatus also comprises optical power meter 128, and a Raman gain control unit 110.

Raman pump laser 120 may be implemented as a sufficiently powerful laser such as a high power semiconductor diode lasers, or a plurality of high power semiconductor lasers. The plurality of high power semiconductor lasers may be of the same wavelength, or purposefully at different wavelengths to provide uniform or otherwise tailored Raman gain across a broad spectrum. Optical fiber span 122 may be implemented using optical fiber, and in a preferred embodiment is single mode fiber such as SMF-28 or LEAF. Wavelength selective optical coupler 124 may be realized as a thin film optical coupler. Optical tap 126 may be a fused coupler, or a thin film coupler. Alternatively, wavelength selective coupler 124 may be a circulator. Optical power meter 128 may be a calibrated photodiode. Raman gain control unit 110 may be a microprocessor, or microcomputer, and fulfills the feedback loop between the optical power meter 128 and the Raman pump laser 120.

Also shown in FIG. 1 is the flow of optical energy in the apparatus, including Raman pump power 130 and optical signal 132. Optical signal fraction 134 is also shown in FIG. 1. Raman pump power 130 is generated by Raman pump laser 120. Optical signal 132 is, in a preferred embodiment, voice or data traffic that is being transmitted from one location to another. Raman pump power 130 is coupled into optical fiber span 122 via wavelength selective optical coupler 124. In the arrangement, optical pump power 130 counter propagates with optical signal 132. Optical tap 126 samples a fraction of the optical signal and directs onto optical power meter 128. It should be noted that the exact arrangement of the apparatus may be modified to achieve the same functionality.

In the arrangement of FIG. 1, the gain of a Raman amplifier with counter propagating pump is saturated as if the pump power were reduced by 1 to 1.5 times the signal power. Consequently, measurement of the power of optical signal 132 via optical tap 126 and optical power meter 128 allows Raman gain control through the Raman gain control unit 110.

At system turn-up, Raman pump power 130 is set to a value $P_{pump,0}$ which yields the desired Raman gain when the amplifier is not saturated because the power of the optical signal 132 is zero. During operation, the signal output power 134, $P_{s,out}$, is measured. The Raman gain control unit is programmed to continually adjust the Raman pump power 130 to a value $P_{pump}=P_{pump,0}+k*P_{s,out}$. The factor k depends on the unsaturated gain and on the fiber type of fiber span 122 (especially the signal loss and the pump loss) but is typically around 1.4. The factor k can be calculated approximately by the expression:

$$k \approx \frac{\lambda_s}{\lambda_p} \frac{\ln(G)}{\frac{\alpha_p}{\alpha_s}\ln(G) - 1}$$

where $\lambda_s$ is the wavelength of optical signal 132, $\lambda_p$ is the wavelength of Raman pump power 130, G is the net Raman gain, $\alpha_p$ is the fiber attenuation coefficient at the wavelength of Raman pump power 130, and $\alpha_s$ is the attenuation coefficient at the wavelength of optical signal 132.

Figure 2:
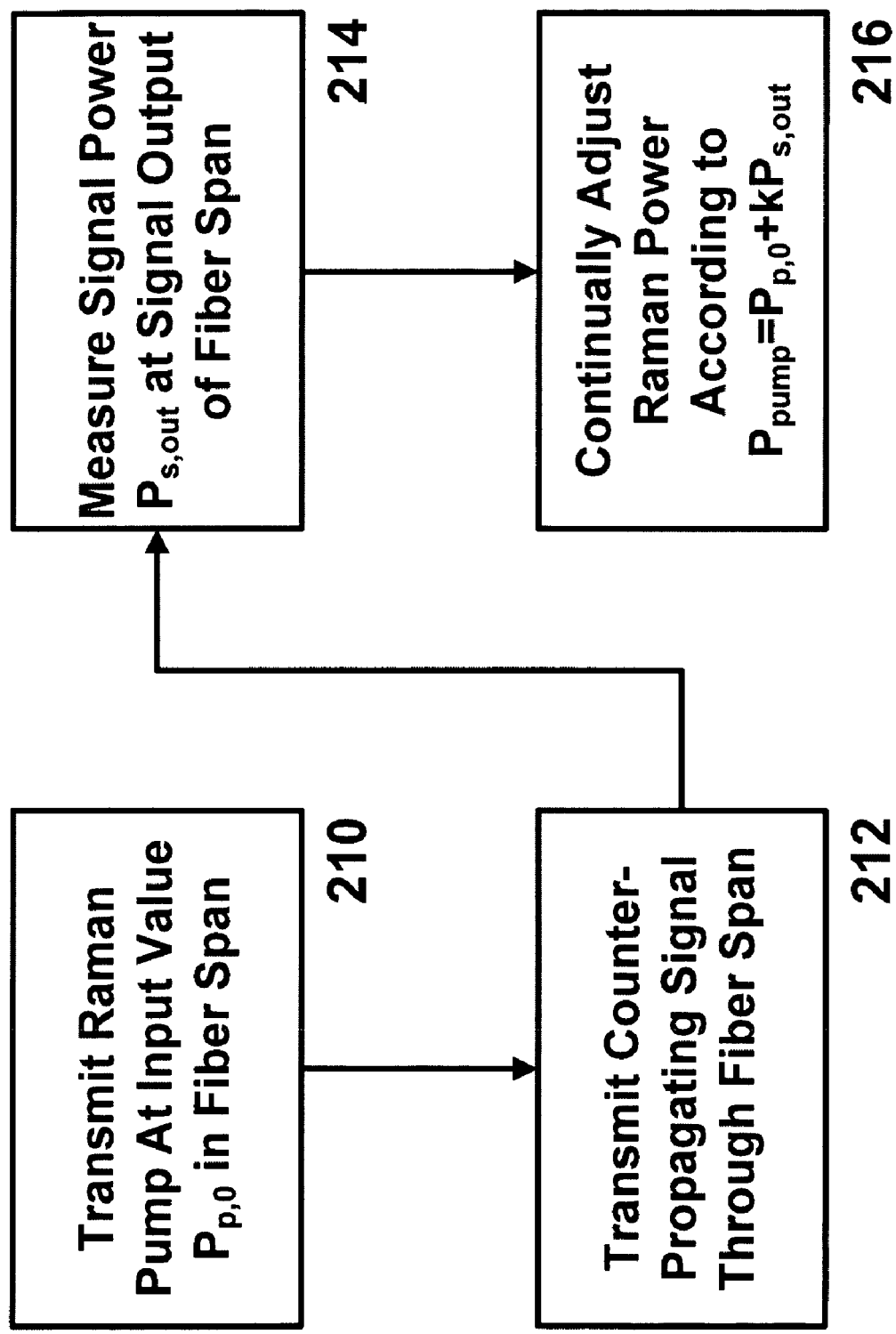
FIG. 2 is a flow chart of a Raman gain control method for counter propagating pump and signal based on signal output power measurements.

Any signal loss, $L_2$ between the output of fiber span 122 and optical power meter 128 needs to be taken into account. Likewise any pump loss, $L_p$, between the pump power reference point and the input to fiber span 122 needs also to be considered. Losses $L_s$ and $L_p$ may be determined at system turn-up and programmed into Raman gain control unit 110. Therefore, including these losses, the pump adjustment needs to yield: $P_{pump}=P_{pump,0}+k*P_{s,out}/L_sL_p$. In FIG. 2 is a flow chart illustrating a method of Raman gain control in accordance with one aspect of the invention. The method comprises a first step 210 of transmitting Raman pump power 130 in fiber span 122 at a value $P_{pump,0}$ and recording the desired Raman gain when the amplifier is not saturated because the power of the optical signal 132 is zero. The method further comprises a second step 212 of counter-propagating optical signal 132 in fiber span 122. Step 214 of the method entails measuring during operation, the signal output power 134, $P_{s,out}$. Step 216 of the method entails continually adjusting the Raman pump power 130 to a value $P_{pump}=P_{pump,0}+k*P_{s,out}$.

Figure 3:
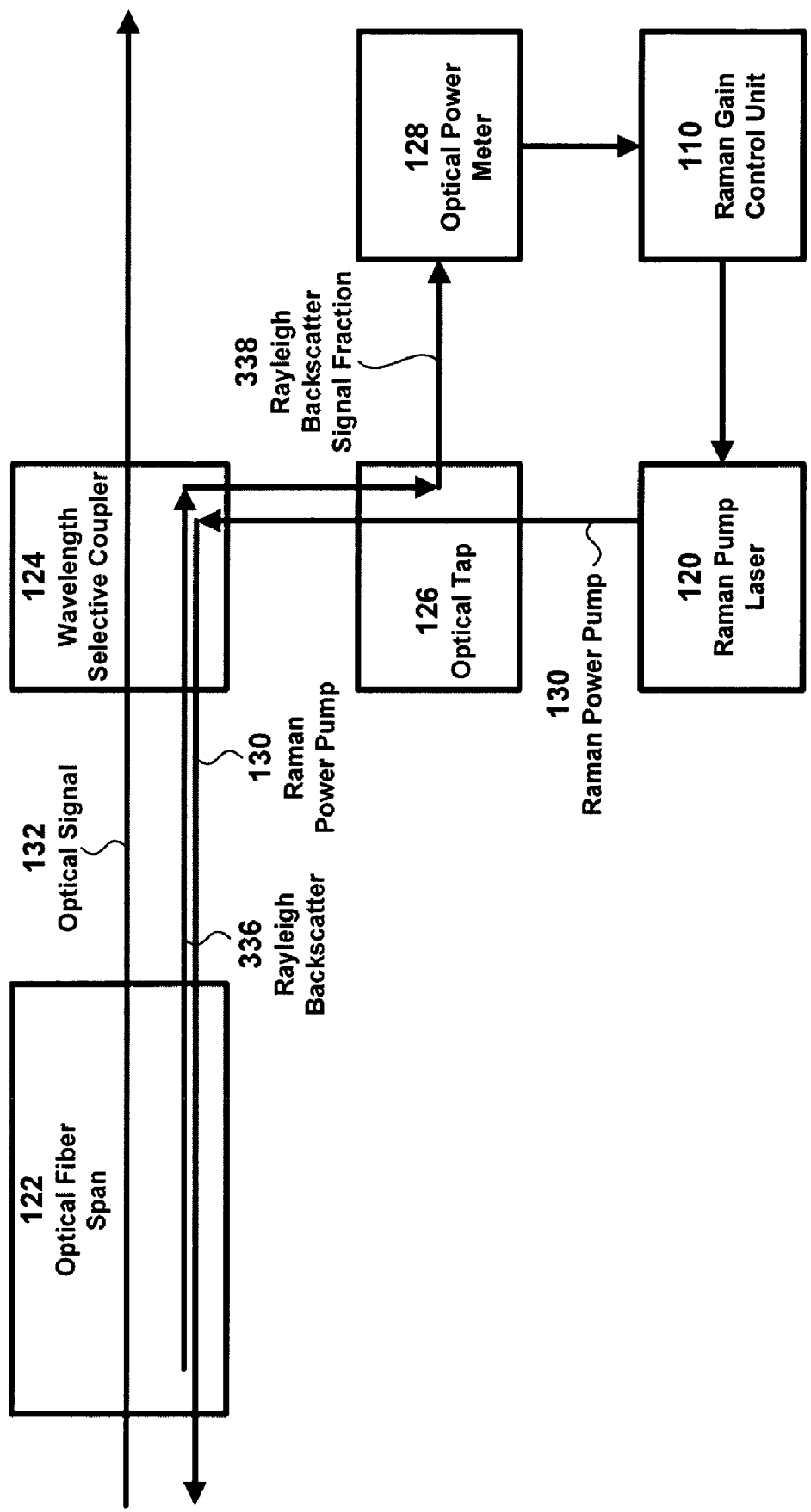
FIG. 3 is a schematic illustration of a Raman gain control apparatus for counter propagating pump and signal based on backscattered pump power measurements.

In FIG. 3 is a block diagram of an alternate embodiment of this invention in which the Rayleigh backscatter 336 portion of the Raman pump power 130 is used to control the Raman gain. The alternate embodiment of FIG. 3 is comprised of Raman pump laser 120 that is optically coupled to a wavelength selective optical coupler 124. Wavelength selective coupler 124 is further optically coupled to fiber span 122. The apparatus also comprises optical tap 126, optical power meter 128, and a Raman gain control unit 110.

Also shown in FIG. 3 is the flow of optical energy in the apparatus, including Raman pump power 130 and optical signal 132. Rayleigh backscatter 336 is generated in the fiber span, and may be used as a control signal for Raman gain control. Rayleigh backscatter signal fraction 338 is also shown in FIG. 3. Raman pump power 130 is generated by Raman pump laser 120. Optical signal 132 is, in a preferred embodiment, voice or data traffic that is being transmitted from one location to another. Raman pump power 130 is coupled into optical fiber span 122 via wavelength selective optical coupler 124. In the arrangement, Raman pump power 130 counter-propagates with optical signal 132. Optical tap 126 samples a fraction of the Rayleigh backscatter and directs Rayleigh backscatter signal fraction 338 onto optical power meter 128. It should be noted that the exact arrangement of the apparatus may be modified to achieve the same functionality.

In reference to operation of FIG. 3, an optical signal 132 of high power saturates and attenuates Raman pump power 130, which is injected from the signal output fiber end. Thus, less Raman pump power penetrates into the fiber and less Rayleigh backscatter 336 is produced. Thus the power level of Rayleigh backscatter is a good measure of Raman gain saturation. The relationship between the power level of Rayleigh backscatter 336 and net Raman gain is nearly independent of gain saturation. Hence, in this invention, the Raman gain is controlled by adjusting the level of Raman pump power 130 such that the level of Rayleigh backscatter 336 is kept constant, or, measured Rayleigh backscatter signal fraction 338 is kept constant. The difference in signal level between Rayleigh backscatter 336 of the Raman pump and Rayleigh backscatter signal fraction 338 does not effect gain control accuracy. Further, no information on fiber loss parameters or scattering parameters is required by Raman gain control unit 110.

In some embodiments there will be deleterious reflections of the Raman pump power 130 at the input to fiber span 122, or in the first few meters of fiber span 122. If this return loss for Raman pump power 130 is known to be $r_{pump}$, the measured Rayleigh backscatter 336 of the Raman pump is corrected by a term $r_{pump}*P_{pump}$ such that the power $P_{back}-r_{pump}*P_{pump}$ is kept constant. In these expressions $P_{pump}$ is the power level of Raman pump power 130, and $P_{back}$ is the power level of Rayleigh backscatter 336.

Further gain control accuracy will be achieved if a loop-back factor k is determined upon calibration such that Raman gain control unit 110 works to keep the power $P_{back}+k*P_{pump}$ constant. In a preferred embodiment, $P_{pump}$ is approximately 500 mW, $P_{back}$ is approximately 0.5 mW and K is approximately 0.0002.

Figure 4:
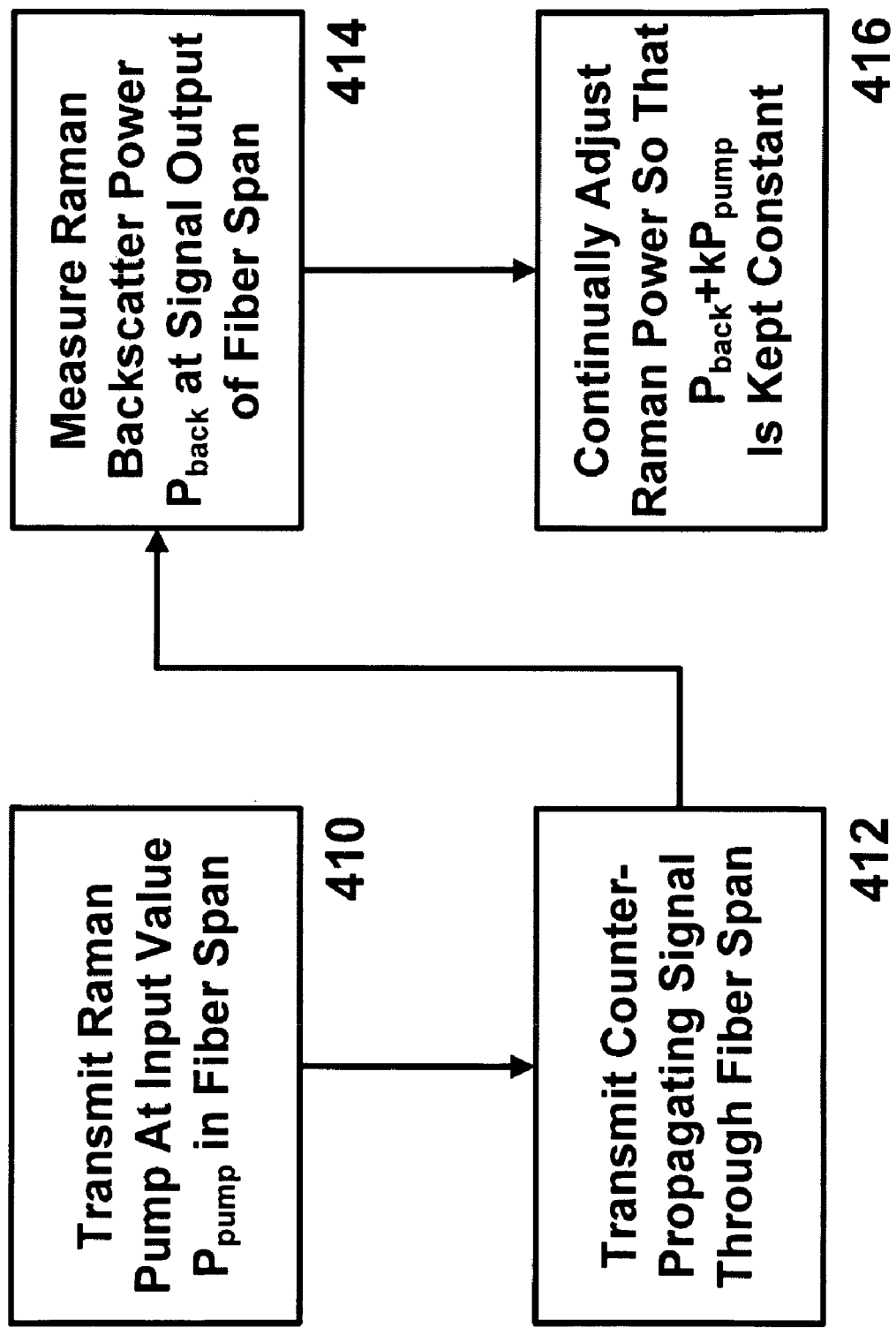
FIG. 4 is a flow chart of a Raman gain control method for counter propagating pump and signal based on backscattered pump power measurements.

In FIG. 4 is a flow chart illustrating a method of Raman gain control in accordance with another aspect of the invention. The method comprises a first step 410 of transmitting Raman pump power 130 in fiber span 122 and recording a value $P_{pump}$. The method further comprises a second step 412 of counter-propagating optical signal 132 in fiber span 122. Step 414 of the method entails measuring during operation, the Rayleigh backscatter signal power, $P_{back}$. Step 416 of the method entails continually adjusting the Raman pump power 130 to keep the power $P_{back}+k*P_{pump}$ constant.

Figure 5:
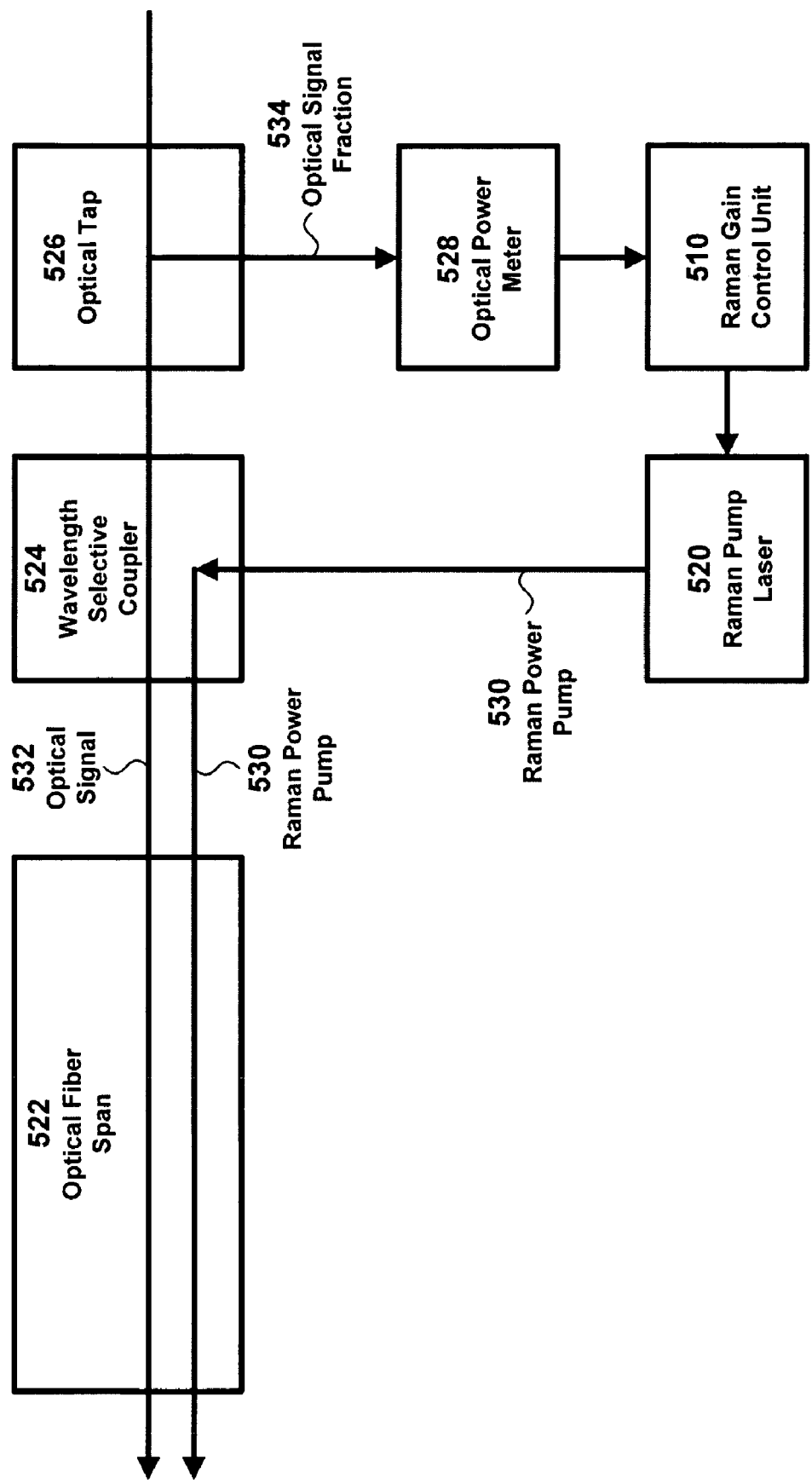
FIG. 5 is a block diagram of a Raman gain control apparatus for co-propagating pump and signal based on signal input power measurements.

In FIG. 5 is shown a block diagram of a Raman gain control apparatus for co-propagating pump and signal based on signal input power measurements. The Raman gain control apparatus comprises a Raman pump laser 520 that is optically coupled to a wavelength selective optical coupler 524. Wavelength selective coupler 524 is further optically coupled to fiber span 522 and optical tap 526. The apparatus also comprises optical power meter 528, and a Raman gain control unit 510.

Raman pump laser 520 may be implemented as a sufficiently powerful laser such as a high power semiconductor diode lasers, or a plurality of high power semiconductor lasers. The plurality of high power semiconductor lasers may be of the same wavelength, or purposefully at different wavelengths to provide uniform or otherwise tailored Raman gain across a broad spectrum. Optical fiber span 522 may be implemented using optical fiber, and in a preferred embodiment is single mode fiber such as SMF-28 or LEAF. Wavelength selective optical coupler 524 may be realized as a thin film optical coupler. Optical tap 526 may be a fused coupler, or a thin film coupler. Optical power meter 528 may be a calibrated photodiode. Raman gain control unit 510 may be a microprocessor, or microcomputer, and fulfills the feedback loop between the optical power meter 528 and the Raman pump laser 520.

Also shown in FIG. 5 is the flow of optical energy in the apparatus, including Raman pump power 530 and optical signal 532. Optical signal fraction 534 is also shown in FIG. 5. Raman pump power 530 is generated by Raman pump laser 520. Optical signal 532 is, in a preferred embodiment, voice or data traffic that is being transmitted from one location to another. Raman pump power 530 is coupled into optical fiber span 522 via wavelength selective optical coupler 524. In the arrangement, optical pump power 530 co-propagates with optical signal 532. Optical tap 526 samples a fraction of the optical signal 532 and directs onto optical power meter 528. It should be noted that the exact arrangement of the apparatus may be modified to achieve the same functionality.

The typical power levels of Raman pump laser 520 are lower in the co-propagating case than for the counter-propagating case in order to reduce pump saturation mitigated cross-talk between the channels of a DWDM system. Typically the net gain is around 10 dB. Larger saturation may be expected, however, because of the higher power of optical signal 532.

The gain saturation of Raman pump power 530 in the co-propagating case is equivalent to a reduction of the pump power by a multiple of the signal input power, as given by:

$$G_{sat} = \exp\left\{\frac{g_R}{\alpha_p}\left[P(0) - S(0)\frac{\lambda_s}{\lambda_p}\left(\frac{G_0-1}{\ln(G_0)} - 1\right)\right]\right\}$$

where $G_{sat}$ is the saturated net Raman gain, $g_R$ is the Raman gain coefficient, $\alpha_p$ is the fiber attenuation coefficient at the Raman pump wavelength, $P(0)$ is the Raman pump power 530 at the entrance to fiber span 522, $S(0)$ is the power of optical signal 532 at the entrance to fiber span 522, $\lambda_s$ is the wavelength of optical signal 532, $\lambda_p$ is the wavelength of Raman pump power 530, and $G_0$ is the unsaturated Raman gain in linear units. The ratio, $\lambda_s/\lambda_p$ is typically approximately 1.07, and the maximum spectral gain, $$\left(\frac{G_0 - 1}{\ln(G_0)} - 1\right),$$

which comprises the second proportionality constant depends strongly on $G_0$, the unsaturated Raman gain in linear units. Consequently, in the embodiment of the invention illustrated in FIG. 5, Raman gain control is implemented based on measured optical signal fraction 534. At system turn-up, Raman pump power 530 is set to a value $P_{pump,0}$ which yields the desired Raman gain. $P_{pump,0}$ is the value of Raman pump power 530 when the amplifier is unsaturated by optical signal 532. During operation, the power of optical signal 532 at the input of fiber span 522 $P_{s,in}$ is measured by optical power meter 528. The Raman gain control unit continually adjusts Raman pump laser 520 so that Raman pump power 530 satisfies $P_{pump} = P_{pump,0} + kP_{s,in}$, where $$k = \frac{\lambda_s}{\lambda_p}\left(\frac{G_0 - 1}{\ln(G_0)} - 1\right).$$

The power ratio, $L_s$, between the input of fiber span 522 and the power at the optical power meter 528 needs to be taken into account. Likewise any pump loss, $L_p$, between the pump power reference point and the input to fiber span 522 needs also to be considered. $L_s$ and $L_p$ may be determined at system turn-up and programmed into Raman gain control unit 510. Therefore, including these losses, the pump adjustment needs to yield: $P_{pump} = P_{pump,0} + k*P_{s,in}/L_s L_p$.

Figure 6:
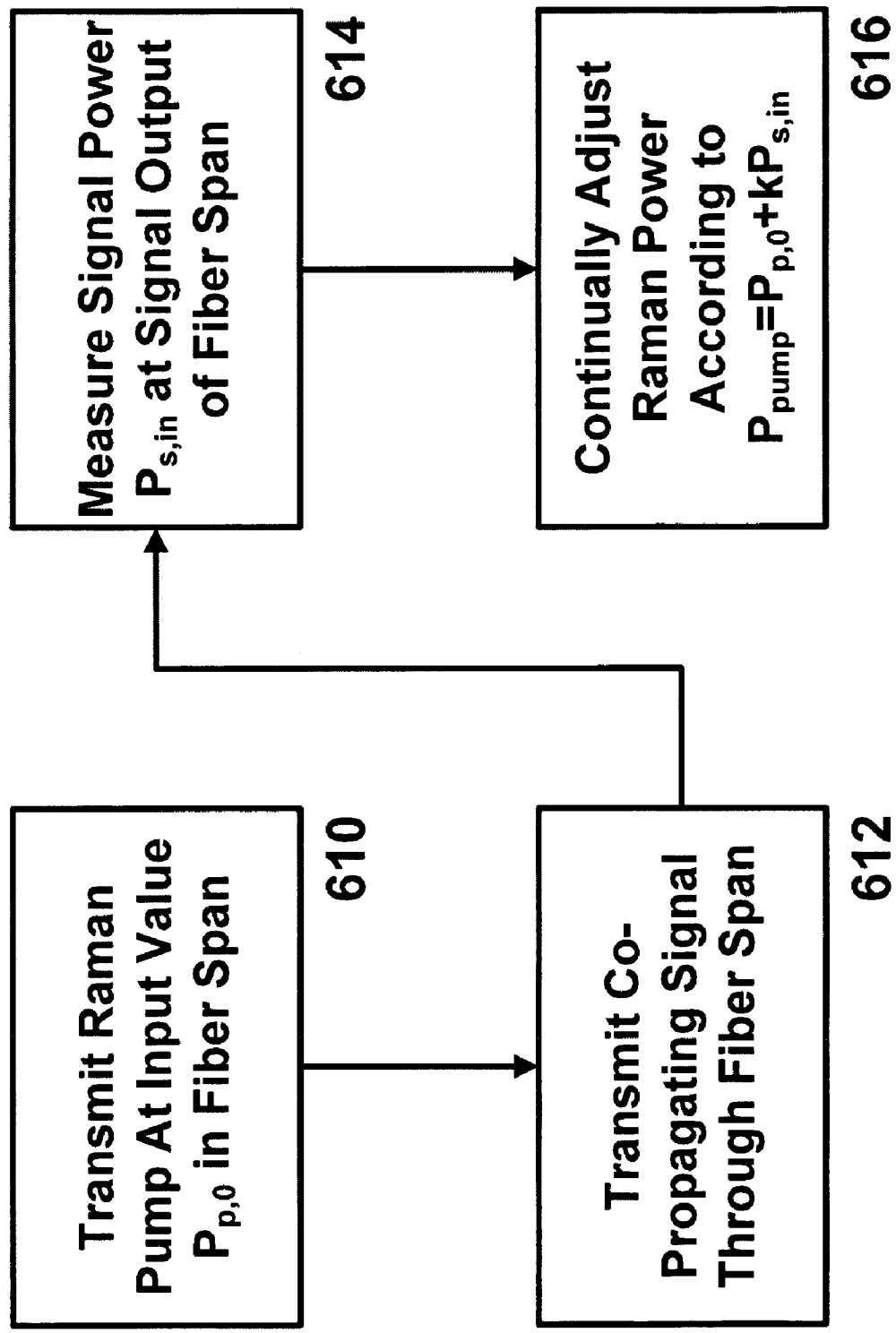
FIG. 6 is a flow chart illustrating a method of Raman gain control in accordance with one aspect of the invention.

FIG. 6 is a flow chart illustrating a method of Raman gain control in accordance with one aspect of the invention. The method comprises a first step 610 of transmitting Raman pump power 530 in fiber span 522 at a value $P_{pump,0}$ which yields the desired Raman gain when the amplifier is not saturated because the power of the optical signal 532 is zero. The method further comprises a second step 612 of counter-propagating optical signal 532 in fiber span 522. Step 614 of the method entails measuring during operation, the signal input power 534, $P_{s,in}$. Step 616 of the method entails continually adjusting the Raman pump power 530 to a value $$P_{pump} = P_{pump,0} + k*P_{s,in} \text{ where } k = \frac{\lambda_s}{\lambda_p}\left(\frac{G_0 - 1}{\ln(G_0)} - 1\right).$$

Figure 7:
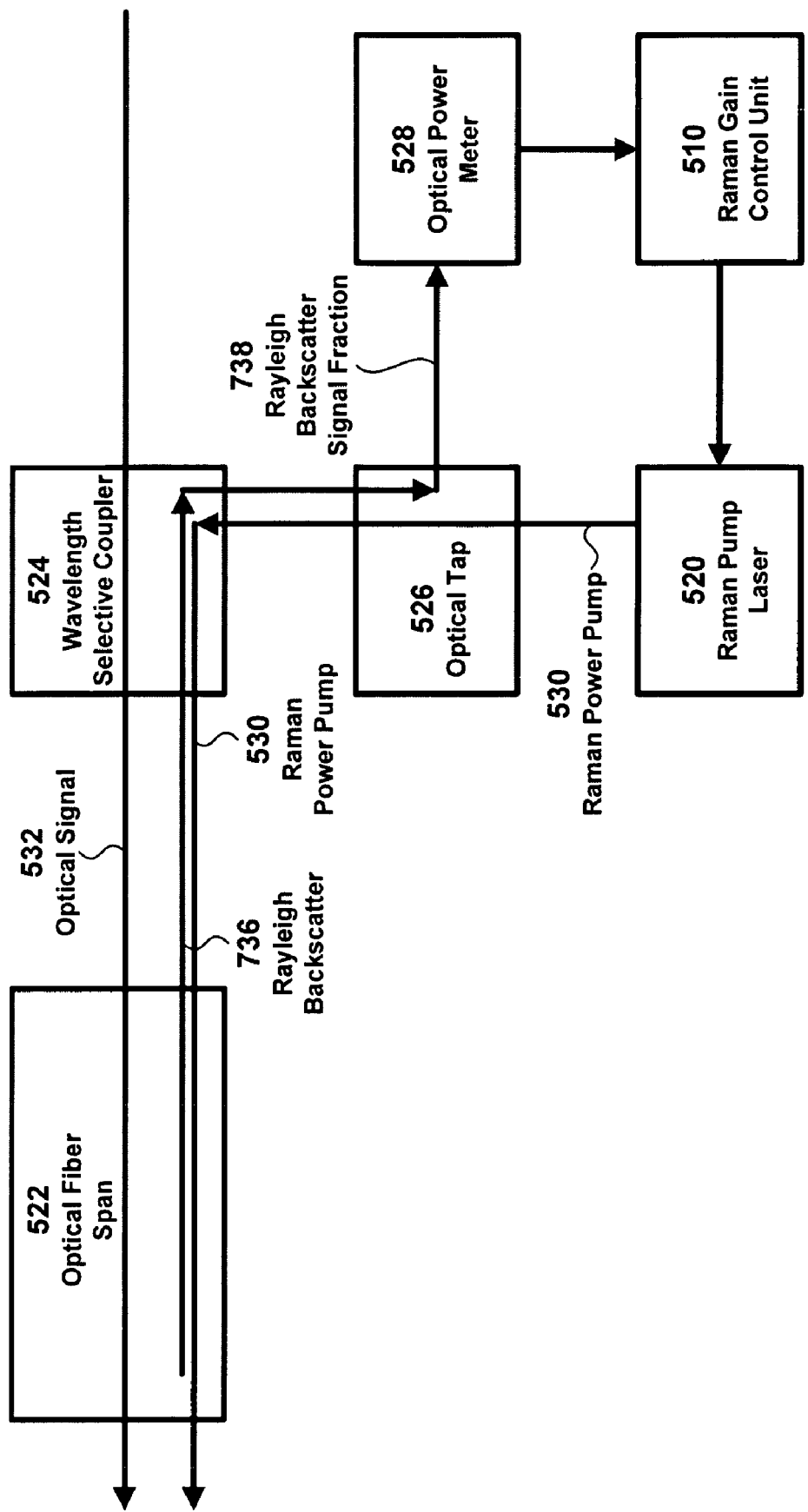
FIG. 7 is a block diagram of a Raman gain control apparatus for co propagating pump and signal based on backscattered pump power measurements.

In FIG. 7 is a block diagram of an alternate embodiment of this invention in which the Rayleigh backscatter 736 portion of the Raman pump power 530 is used to control the Raman gain. The alternate embodiment of FIG. 7 is comprised of Raman pump laser 520 that is optically coupled to a wavelength selective optical coupler 524. Wavelength selective coupler 524 is further optically coupled to fiber span 522. The apparatus also comprises optical tap 526, optical power meter 528, and a Raman gain control unit 510.

Also shown in FIG. 7 is the flow of optical energy in the apparatus, including Raman pump power 530 and optical signal 532. Rayleigh backscatter 736 is generated in the fiber span, and may be used as a control signal for Raman gain control. Rayleigh backscatter signal fraction 738 is also shown in FIG. 7. Raman pump power 530 is generated by Raman pump laser 520. Optical signal 532 is, in a preferred embodiment, voice or data traffic that is being transmitted from one location to another. Raman pump power 530 is coupled into optical fiber span 522 via wavelength selective optical coupler 524. In the arrangement, Raman pump power 530 co propagates with optical signal 532. Optical tap 526 samples a fraction of the Rayleigh backscatter and directs Rayleigh backscatter signal fraction 738 onto optical power meter 528. It should be noted that the exact arrangement of the apparatus may be modified to achieve the same functionality.

In reference to operation of FIG. 7, an optical signal 532 of high power saturates and attenuates Raman pump power 530, which is injected from the signal output fiber end. Thus, less Raman pump power penetrates into the fiber and less Rayleigh backscatter 736 is produced. Thus the power level of Rayleigh backscatter is a good measure of Raman gain saturation. The relationship between the power level of Rayleigh backscatter 736 and net Raman gain is nearly independent of gain saturation. Hence, in this invention, the Raman gain is controlled by adjusting the level of Raman pump power 530 such that the level of Rayleigh backscatter 736 is kept constant, or, measured Rayleigh backscatter signal fraction 738 is kept constant. The difference in signal level between Rayleigh backscatter 736 of the Raman pump and Rayleigh backscatter signal fraction 738 does not effect gain control accuracy. Further, no information on fiber loss parameters or scattering parameters is required by Raman gain control unit 510.

In some embodiments there will be deleterious reflections of the Raman pump power 530 at the input to fiber span 522, or in the first few meters of fiber span 522. If this return loss for Raman pump power 530 is known to be $r_{pump}$, the measured Rayleigh backscatter 736 is corrected by a term $r_{pump}*P_{pump}$ such that the power $P_{back} - r_{pump}*P_{pump}$ is kept constant. In these expressions $P_{pump}$ is the power level of Raman pump power 530, and $P_{back}$ is the power level of Rayleigh backscatter 736.

Further gain control accuracy will be achieved if a loop-back factor k is determined upon calibration such that Raman gain control unit 510 works to keep the power $P_{back} + k*P_{pump}$ constant. In a preferred embodiment, K is approximately −0.00002.

Figure 8:
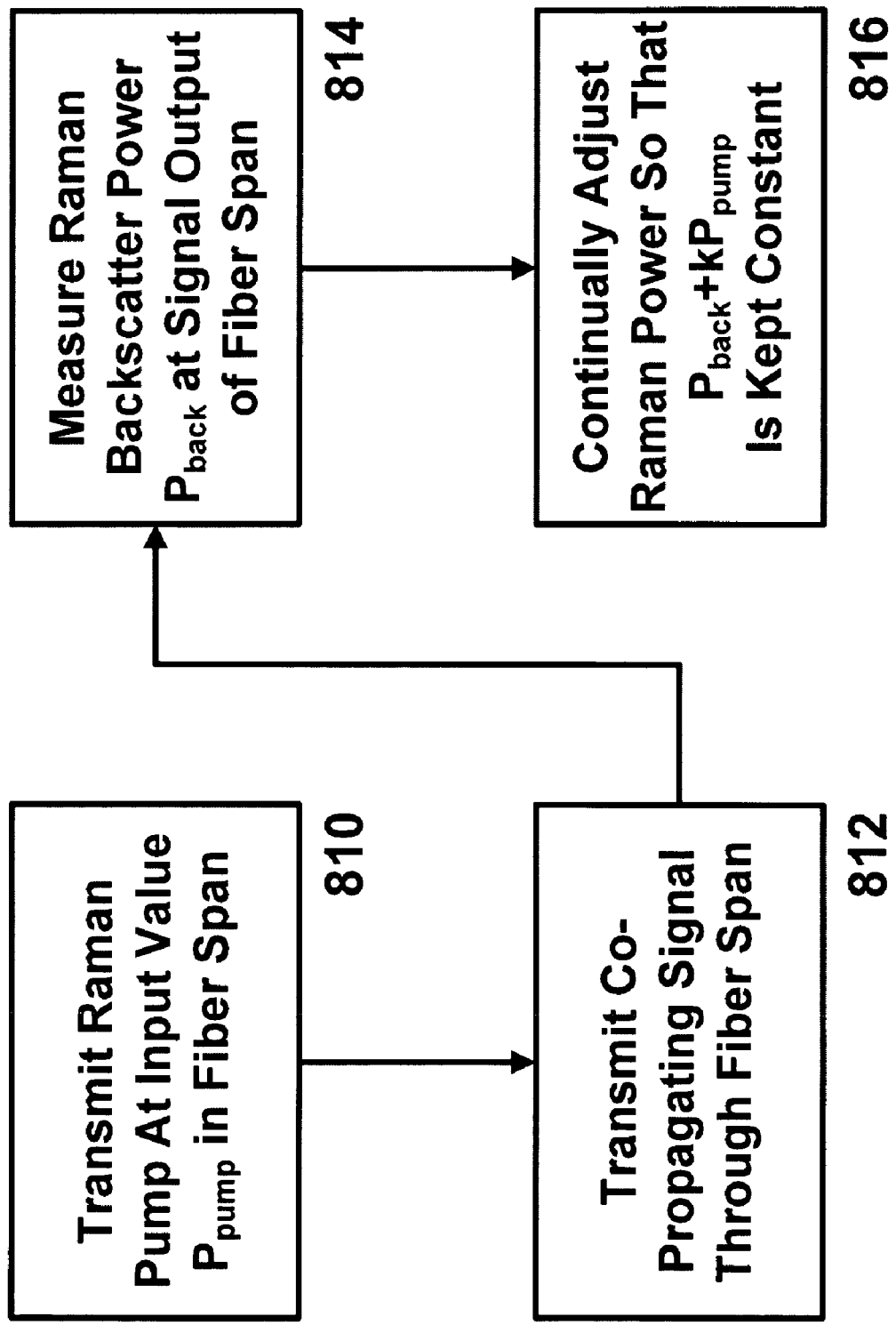
FIG. 8 is a flow chart illustrating a method of Raman gain control in accordance with another aspect of the invention.

In FIG. 8 is a flow chart illustrating a method of Raman gain control in accordance with another aspect of the invention. The method comprises a first step 810 of transmitting Raman pump power 530 in fiber span 522 at a value $P_{pump}$. The method further comprises a second step 812 of counter-propagating optical signal 532 in fiber span 522. Step 814 of the method entails measuring during operation, the Rayleigh backscatter signal power, $P_{back}$. Step 816 of the method entails continually adjusting the Raman pump power 530 to keep the power $P_{back} + k*P_{pump}$ constant.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. A system for controlling Raman gain of an optical signal in an optical fiber span comprising:
   an optical power meter connected to the optical fiber span;
   a Raman gain controller connected to the optical power meter; and a Raman pump laser connected to the Raman gain controller, wherein the Raman pump laser is configured to produce Raman pump power, and wherein the Raman gain controller is configured to read at least a portion of a backscatter of the Raman pump power via the optical power meter and to adjust the Raman pump laser to keep the backscatter substantially constant.

2. The system of claim 1 wherein the backscatter is kept substantially constant according to the following equation:

$$P = P_{Back} - r_{pump} * P_{pump}$$

where
P=substantially constant power
$r_{pump}$=return loss;
$P_{pump}$=Raman pump laser power; and
$P_{back}$=power level of the backscatter.

3. The system of claim 1 wherein the backscatter is kept substantially constant according to the following equation:

$$P = P_{back} + kP_{pump}$$

where
P=substantially constant power
$P_{back}$=power level of the backscatter;
k=loop back factor; and
$P_{pump}$=Raman pump laser power.

4. The system of claim 1 wherein the optical signal and the Raman pump power counter-propagate.

5. The system of claim 1 wherein the optical signal and the Raman pump power co-propagate.

6. The system of claim 1 further comprising an optical coupler connected to the optical fiber span and the Raman pump laser, wherein the optical coupler is configured to couple the Raman pump power to optical fiber span.

7. The system of claim 6 further comprising an optical tap connected to the optical coupler and the optical power meter, wherein the optical tap is configured to direct at least the portion of the backscatter to the optical power meter.

8. The system of claim 1 further comprising an optical tap connected to the optical fiber span and the optical power meter, wherein the optical tap is configured to direct at least the portion of the backscatter to the optical power meter.

9. A method of controlling Raman gain in a fiber span comprising:
transmitting a Raman pump power on the fiber span via a Raman pump laser;
transmitting an optical signal on the fiber span;
measuring at least a portion of a backscatter power associated with the Raman pump power; and
adjusting a Raman gain of the Raman pump laser to maintain the backscatter power substantially constant.

10. The method of claim 9 wherein the backscatter power is kept substantially constant according to the following equation:

$$P = P_{back} + kP_{pump}$$

where
P=substantially constant power
k=loop back factor;
$P_{back}$=backscatter power level;
$P_{pump}$=Raman pump power; and
$r_{pump}$=return loss.

11. The method of claim 9 wherein the optical signal and the Raman pump power counter-propagate.

12. The method of claim 9 wherein the optical signal and the Raman pump power co-propagate.

13. The method of claim 9 wherein the backscatter power is kept substantially constant according to the following equation:

$$P = P_{back} - r_{pump} * P_{pump}$$

where
P=substantially constant power
$P_{back}$=backscatter power level;
$P_{pump}$=Raman pump power; and
$r_{pump}$=return loss.

14. The method of claim 9 wherein the backscatter power is measured at an input of the fiber span.

15. The method of claim 9 wherein the backscatter power is measured at an output of the fiber span.

16. A computer-readable medium having stored thereon computer executable instructions for controlling Raman gain in a fiber span, the computer executable instructions comprising instructions for:
transmitting a Raman pump power on the fiber span via a Raman pump laser;
measuring at least a portion of a backscatter power associated with the Raman pump power; and
adjusting a Raman gain of the Raman pump laser to maintain the backscatter power substantially constant.

17. The computer-readable medium of claim 16 wherein an optical signal and the Raman pump power counter-propagate on the fiber span.

18. The computer-readable medium of claim 16 wherein an optical signal and the Raman pump power co-propagate on the fiber span.

19. The computer-readable medium of claim 16 wherein the computer executable instructions further comprise instructions for maintaining the backscatter power substantially constant via the following equation:

$$P = P_{back} - r_{pump} * P_{pump}$$

where
P=substantially constant power
$P_{back}$=backscatter power level;
$P_{pump}$=Raman pump power; and
$r_{pump}$=return loss.

20. The computer-readable medium of claim 16 wherein the computer executable instructions further comprise instructions for maintaining the backscatter power substantially constant via the following equation:

$$P = P_{back} + kP_{pump}$$

where
P=substantially constant power
k=loop back factor;
$P_{back}$=backscatter power level;
$P_{pump}$=Raman pump power; and
$r_{pump}$=return loss.

21. The computer-readable medium of claim 16 wherein the backscatter power is measured at an input of the fiber span.

22. The computer-readable medium of claim 16 wherein the backscatter power is measured at an output of the fiber span.

* * * * *

UNITED STATES PATENT AND TRADEMARK OFFICE
CERTIFICATE OF CORRECTION

| | | |
|---|---|---|
| PATENT NO. | : 7,924,496 B2 | Page 1 of 1 |
| APPLICATION NO. | : 10/454772 | |
| DATED | : April 12, 2011 | |
| INVENTOR(S) | : Eiselt | |

It is certified that error appears in the above-identified patent and that said Letters Patent is hereby corrected as shown below:

Column 9, line 14, in Claim 2, delete "power" and insert -- power; --.

Column 9, line 23, in Claim 3, delete "power" and insert -- power; --.

Column 9, line 57, in Claim 10, delete "power" and insert -- power; --.

Column 10, line 9, in Claim 13, delete "power" and insert -- power; --.

Column 10, line 40, in Claim 19, delete "power" and insert -- power; --.

Column 10, line 51, in Claim 20, delete "power" and insert -- power; --.

Signed and Sealed this
Ninth Day of August, 2011

David J. Kappos
*Director of the United States Patent and Trademark Office*